(12) United States Patent
Stahancyk et al.

(10) Patent No.: US 6,450,756 B1
(45) Date of Patent: Sep. 17, 2002

(54) AIRCRAFT TOWBAR APPARATUS

(76) Inventors: Jack L. Stahancyk, P.O. Box 671871, Chugiak, AK (US) 99567; Timothy E. Trapp, 12719 Faith Cir., Eagle River, AK (US) 99577

( * ) Notice: Subject to any disclaimer, the term of this patent is extended or adjusted under 35 U.S.C. 154(b) by 0 days.

(21) Appl. No.: 09/767,338

(22) Filed: Jan. 23, 2001

(51) Int. Cl.[7] .................................................. B64F 1/04
(52) U.S. Cl. ...................... 414/426; 414/429; 414/482; 244/50; 180/904; 280/503; 280/515; 280/656
(58) Field of Search .................................. 414/427, 428, 414/429, 482, 483; 280/503, 515, 656; 244/50; 80/904

(56) References Cited

U.S. PATENT DOCUMENTS

| | | | |
|---|---|---|---|
| 1,703,652 A | * 2/1929 | Azarraga | |
| 2,692,149 A | * 10/1954 | Wilcox | |
| 2,706,881 A | * 4/1955 | McDonald | |
| 3,624,811 A | * 11/1971 | Brackett | 280/503 |
| 3,868,128 A | * 2/1975 | Mahieu | 280/453 |
| 3,895,828 A | 7/1975 | Bitantis | |
| 3,955,832 A | 5/1976 | Kalmanson | |
| 3,995,878 A | 12/1976 | Geraci et al. | |
| 4,055,329 A | 10/1977 | Hammond | |
| 4,269,429 A | 5/1981 | Eichstadt | |
| 4,470,564 A | 9/1984 | Johnson | |
| 4,488,612 A | * 12/1984 | Patterson | 180/904 |
| 4,883,280 A | 11/1989 | Christian | |
| 4,991,862 A | 2/1991 | Tsao et al. | |
| 5,481,769 A | 1/1996 | Schneider | |
| 5,494,310 A | 2/1996 | Soles | |
| 5,967,541 A | * 10/1999 | Johansen | 280/515 |

FOREIGN PATENT DOCUMENTS

GB   2248215   * 4/1992

* cited by examiner

Primary Examiner—James W. Keenan
(74) Attorney, Agent, or Firm—Dale J. Ream

(57) ABSTRACT

An aircraft towbar apparatus comprises a pair of tubular members having proximal ends coupled to a hitch assembly for attachment to a towing vehicle. Each tubular member includes a gripping member at a distal end for gripping an aircraft wheel assembly. The apparatus includes a wheel assembly intermediate proximal and distal ends which serves as a fulcrum for vertical positioning of the gripping members relative to an aircraft wheel assembly. A support handle extends from the distal end of one tubular member to enable a user to vertically position the gripping members. A scissor jack is connected to the tubular members and extends therebetween at a position spaced from the distal ends. An elongate handle bar is coupled to the scissor jack and extends to a crank handle adjacent the hitch assembly such that a user may rotatably actuate the scissor jack to vary the spacing between the tubular members.

1 Claim, 4 Drawing Sheets

AIRCRAFT TOWBAR APPARATUS

BACKGROUND OF THE INVENTION

This invention relates generally to a towing apparatus and, more particularly, to a towbar apparatus which may be quickly and easily operated by one person for towing aircraft when not using engine power.

Towbars and aircraft tugs are needed to move aircraft in and out of maintenance and storage hangars when the aircraft is not operating under engine power. These towing apparatus are especially necessary in the case of moving helicopters. Towing aircraft is especially challenging at small airports where the pilot may have to manipulate the towing apparatus by himself.

Various devices have been proposed in the art for towing aircraft. Although assumably effective for their intended purposes, the existing devices do not enable a user to adjust both laterally and vertically the aircraft wheel assembly gripping mechanism by himself while maintaining his position adjacent the hitch assembly.

Therefore, it is desirable to have an aircraft towbar apparatus which may be coupled both to a towing vehicle and to an aircraft wheel assembly without a single operator having to walk between the tow vehicle and aircraft. Further, it is desirable to have an aircraft towbar apparatus having aircraft wheel assembly grippers that may be adjusted vertically and laterally by a user from a single position adjacent the towbar hitch assembly.

SUMMARY OF THE INVENTION

An aircraft towbar according to the present invention includes first and second tubular members having respective proximal and distal ends relative to an operator's position during use. A hitch assembly is releasably coupled to respective proximal ends, the hitch assembly having overlapping plates that are pivotal relative to one another and formed for releasable attachment to a towing vehicle. An inwardly protruding gripping member is releasably coupled to each distal end of first and second tubular members for gripping an aircraft wheel assembly when properly positioned thereabout. A wheel assembly having a pair of wheels connected with an axle is rotatably coupled to the tubular members at a position spaced from the distal ends thereof. Therefore, the wheel assembly serves as a fulcrum for operation of the tubular members as levers. In other words, a downward movement of the proximal ends causes an upward movement of the distal ends, and vice versa.

The towbar apparatus further includes a scissor jack extending between the first and second tubular members for selectively varying the lateral spacing between the tubular members. The jack is slightly spaced apart from the distal ends such that the distal ends are increasingly spaced apart when the scissor jack is expanded while the proximal ends remain coupled together by the hitch assembly. The scissor jack includes scissor arm mechanisms that open or close upon rotation of a threaded rod. An elongate handle bar is coupled at one end to the threaded rod and extends to an opposed end supported above the hitch assembly with a bracket. A crank handle is fixedly attached to the elongate handle bar over the hitch assembly. Therefore, a user may open or close the scissor jack so as to adjust the lateral space between the gripping members by rotating the crank handle without having to move away from a hitch assembly position. The apparatus further includes a support handle at the distal end to enable the user to vertically adjust the position of the gripping members. Accordingly, a single user may easily manipulate, both vertically and laterally, the position of the gripping members whereby to couple one end of the towbar apparatus to an aircraft wheel assembly while maintaining a single position whereby to also couple another end of the apparatus to a towing vehicle.

Therefore, a general object of this invention is to provide a towbar apparatus for towing aircraft with a towing vehicle.

Another object of this invention is to provide a towbar apparatus, as aforesaid, which may be coupled to an aircraft wheel assembly and to a towing vehicle from a single user position.

Still another object of this invention is to provide a towbar apparatus, as aforesaid, having aircraft wheel assembly gripping members that may be positioned vertically and laterally about an aircraft wheel assembly from a single user position.

Yet another object of this invention is to provide a towbar apparatus, as aforesaid, in which the lateral space between a pair of tubular members may be varied by rotating an elongate crank handle.

A further object of this invention is to provide a towbar apparatus, as aforesaid, in which a hitch assembly includes pivotal plates which accommodate the varying of lateral space between distal ends of the tubular members.

Other objects and advantages of this invention will become apparent from the following description taken in connection with the accompanying drawings, wherein is set forth by way of illustration and example, an embodiment of this invention.

BRIEF DESCRIPTION OF THE INVENTION

DESCRIPTION OF THE PREFERRED EMBODIMENTS

Figure 1:
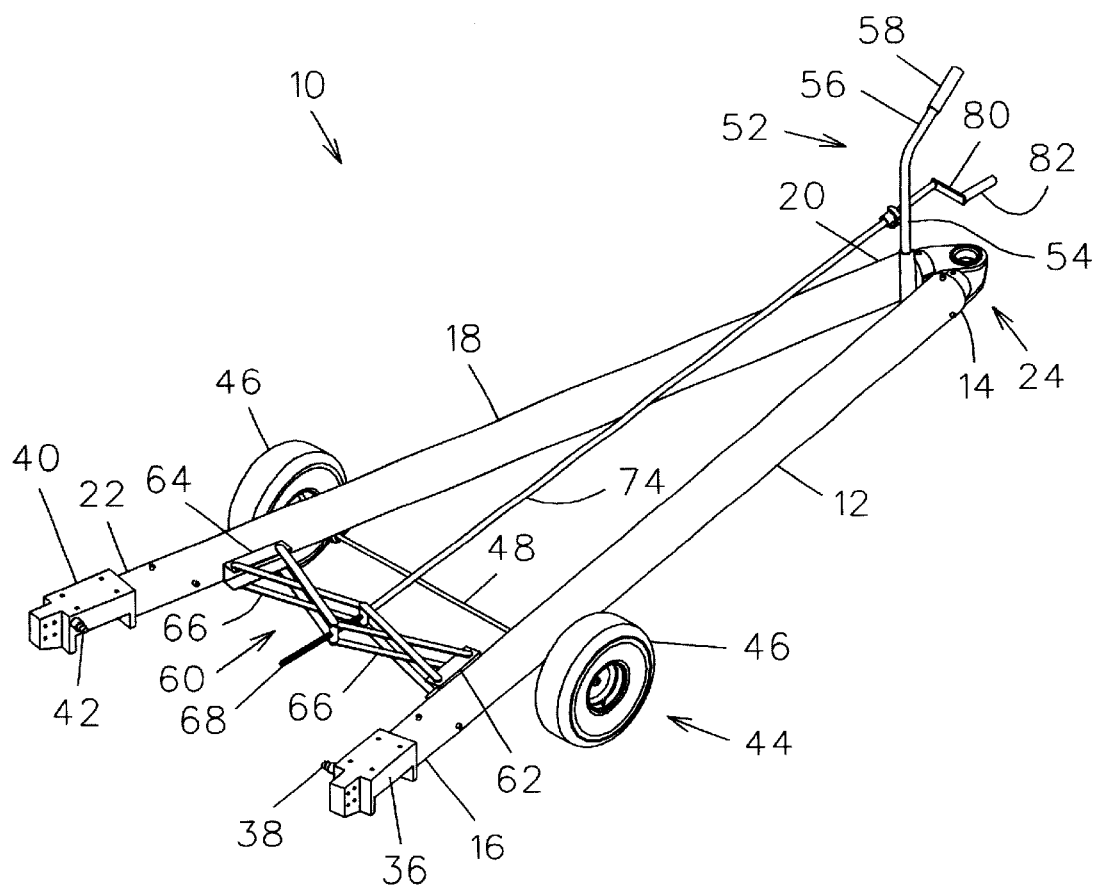
FIG. 1 is a perspective view of an aircraft towbar apparatus according to a preferred embodiment of the present invention.
Figure 2:
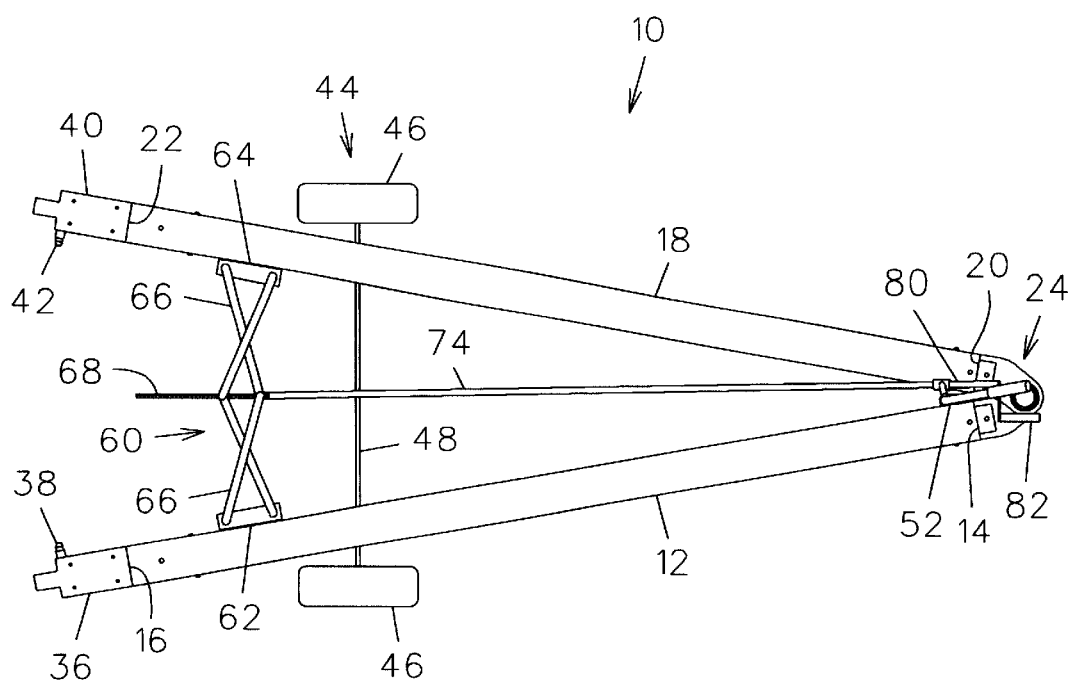
FIG. 2 is a top view of the towbar apparatus as in FIG. 1.
Figure 3:
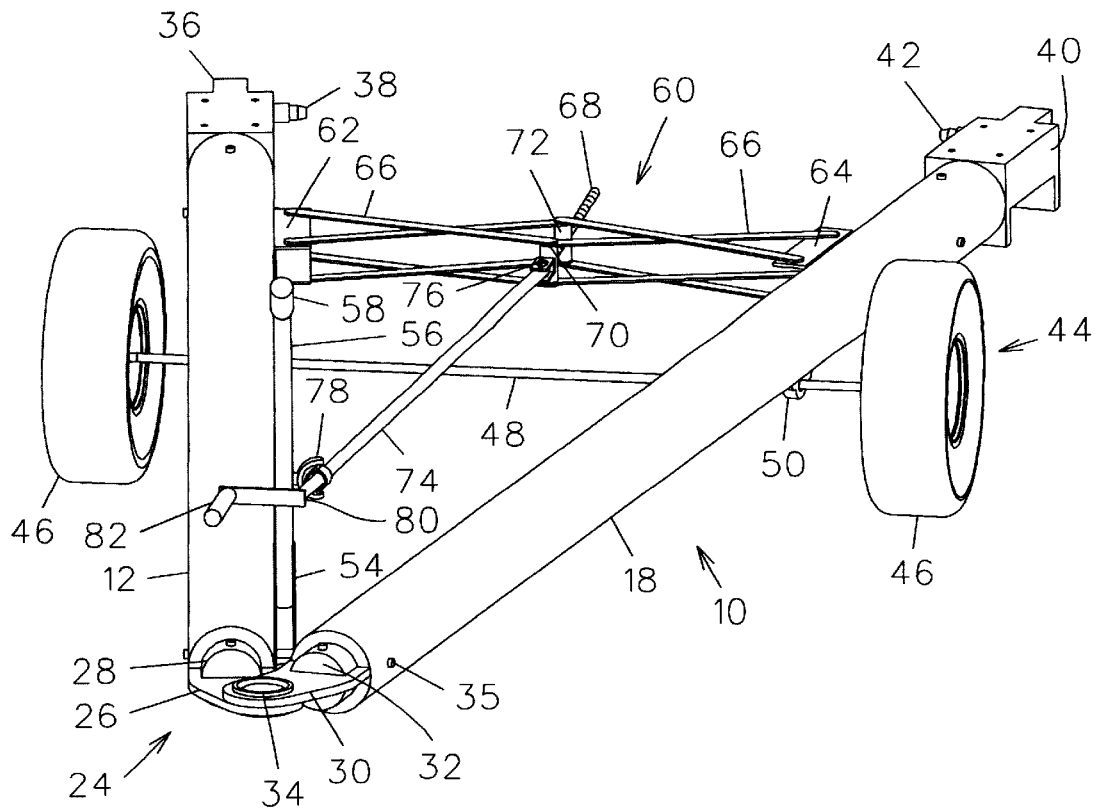
FIG. 3 is another perspective view of the towbar apparatus as in FIG. 1.
Figure 4:
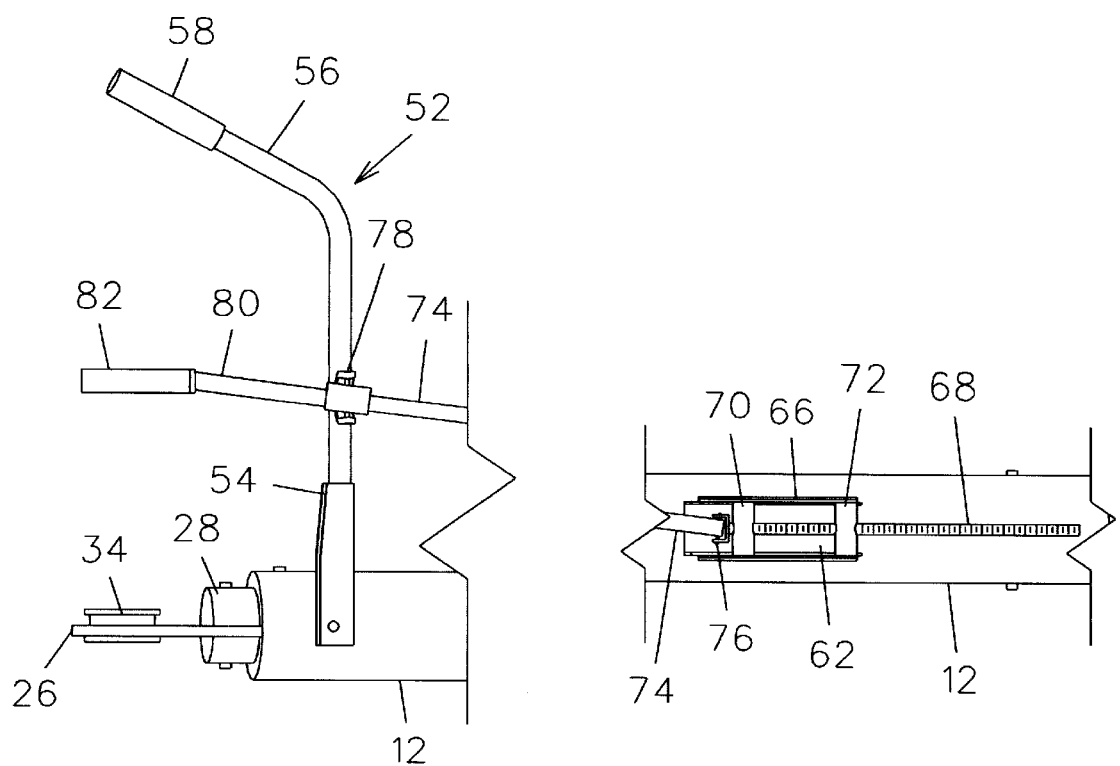
FIG. 4 is a fragmentary view of the towbar apparatus as in claim 1 illustrating a crank handle coupled to a scissor jack, and a support handle.

An aircraft towbar apparatus 10 according to a preferred embodiment of the present invention will now be described with reference to FIGS. 1–4 of the accompanying drawings. The towbar apparatus 10 includes first 12 and second 18 open-ended tubular members having proximal ends 14, 20 and distal ends 16, 22, respectively, relative to a user's use position (FIG. 1). A hitch assembly 24 is releasably coupled to the proximal ends 14, 20 of the first 12 and second 18 tubular members. The hitch assembly 24 includes first 26 and second 30 crescent-shaped plates fixedly attached to cylindrical insert portions 28, 32, respectively (FIG. 3). Each insert portion includes a diameter slightly smaller than a diameter of respective tubular members for slidable insertion therein. The insert members may be releasably secured with pins 35, bolts, or other fasteners. Each plate defines an aperture sized to mate with a cylindrical sleeve 34 having a longitudinal bore (FIG. 4). The plates are pivotally coupled to the sleeve 34 and the sleeve 34 is formed to mate with the hitch of a towing vehicle.

First 36 and second 40 head assemblies are releasably coupled to respective distal ends 16, 22 of the first 12 and second 18 tubular members in a manner substantially similar to the hitch assembly insert portions 28, 32 described above (FIG. 1). In other words, each head assembly includes a cylindrical portion (not shown) formed for slidable insertion into a respective tubular member and releasably held therein with fasteners. First 36 and second 40 head assemblies further include respective gripping members 38, 42. Each gripping member includes a generally cylindrical configuration that extends inwardly toward an opposed gripping member. These gripping members are configured to securely grip a wheel or wheel assembly of an aircraft, as to be further described below.

The towbar apparatus 10 further includes a wheel assembly 44 coupled to the tubular members 12, 18 intermediate proximal and distal ends thereof (FIG. 3). The wheel assembly 44 includes a pair of wheels 46 connected with an axle 48. The axle is rotatably coupled to first 12 and second 18 tubular members with pillow block bearings 50. It should be understood that the axle 48 is long enough such that the wheels 46 are not contacted by the tubular members 12, 18 when they are laterally expanded, as to be further described below.

The towbar apparatus 10 further includes a handle member 52 having a base portion 54 normal to the first tubular member and extending upward therefrom adjacent a proximal end 14 of the first tubular member 12 (FIG. 4). The handle member 52 further includes a secondary lifting portion 56 extending generally upwardly from the base portion 54 at about a 45° angle. The lifting portion 56 extends to a point above the hitch assembly 24 and includes a grip member 58 whereby a user may manipulate the proximal ends 14, 20 of first 12 and second 18 tubular members in upward or downward directions relative to the wheel assembly 44 for vertically positioning the head assemblies 36, 40 as desired. The wheel assembly 44, therefore, serves as a fulcrum for lever-type movement of the tubular members 12, 18.

The towbar apparatus 10 further includes a scissor jack 60 extending between the first 12 and second 18 tubular members for varying the lateral space therebetween (FIG. 1). The scissor jack 60 is spaced from the distal ends 16, 22 of the first 12 and second 18 tubular members and is intermediate the distal ends 16, 22 and the wheel assembly 44. The scissor jack 60 includes a first mounting plate 62 fixedly attached to the first tubular member 12 and a second mounting plate 64 fixedly attached to the second tubular member 18. Opposed pairs of scissor arm mechanisms 66 are aligned with respective mounting plates, are coupled at respective ends to respective mounting plates, and are pivotally coupled together at respective opposed ends with couplings so as to form first 70 and second 72 pivot points (FIGS. 1 and 4). A threaded rod 68 extends through the first 70 and second 72 pivot point couplings, the second pivot point coupling 72 defining a bore adapted to threadably mate with the threaded rod 68. Therefore, a rotation of the threaded rod 68 causes the scissor arm mechanisms to open (expand) or close (retract).

A first end of an elongate handle bar 74 is attached to the threaded rod 68 with a coupling 76 that allows the handle bar 74 to swivel as the bar angle changes upon lateral space variation of the tubular members. The threaded rod 68 is rotated upon user rotation of the handle bar 74. The handle bar 74 extends toward the proximal ends 14, 20 of the tubular members 12, 18, respectively, and is supported above the hitch assembly 24 by a bracket 78 mounted to the handle member 52 (FIGS. 3 and 4). A crank handle 80 is coupled to a second end of the elongate handle bar 74 such that a user may rotate the threaded rod 68 from a position at the proximal end of the I apparatus 10. The crank handle 80 includes a roller bearing sleeve 82 so that a user need not readjust his grip during multiple rotations of the crank handle 80.

In use, a user may maneuver the apparatus 10 into alignment with an aircraft wheel assembly by lifting the hitch assembly 24 off a ground surface using the handle member 52. The user may then crank the crank handle 80 so as to rotate the threaded rod 68 in a direction that causes the scissor jack to open or expand, thus increasing the lateral space between distal ends 16, 22 of the first 12 and second 18 tubular elements and first 36 and second 40 head assemblies. With the gripping members 38, 42 sufficiently separated, the apparatus may be rolled toward the aircraft wheel assembly until the gripping members are properly aligned on both sides thereof. Vertical alignment of the gripping members 38, 42 may be adjusted with vertical movement of the handle member 52 with the wheel assembly 44 serving as a fulcrum. The crank handle 80 may then be rotated in an opposite direction whereby to close the scissor jack and tighten the gripping members 38, 42 about the aircraft wheel assembly. The hitch assembly 24 may then be coupled to a corresponding hitch of a towing vehicle for movement of the aircraft. All of these maneuvers and couplings may be accomplished without the user leaving his position adjacent the proximal or hitch end of the apparatus 10.

It is understood that while certain forms of this invention have been illustrated and described, it is not limited thereto except insofar as such limitations are included in the following claims and allowable functional equivalents thereof.

Having thus described the invention, what is claimed as new and desired to be secured by letters patent is as follows:

1. An aircraft towbar apparatus, comprising:

first and second tubular members, each tubular member having a proximal end and an opposed distal end;

a hitch assembly adapted to be releasably coupled to a towing vehicle, said hitch assembly comprising:

first and second insert portions having cylindrical configurations adapted for releasable insertion into respective proximal ends of said first and second tubular members;

a sleeve configured to mate with a hitch of a towing vehicle;

a first crescent-shaped plate coupled to said first insert portion and defining a first circular aperture pivotally coupled to said sleeve;

a second crescent-shaped plate coupled to said second insert portion and defining a second circular aperture pivotally coupled to said sleeve in overlapping relation to said first plate;

a wheel assembly having a pair of wheels connected to one another with m axle, said axle being rotatably coupled to said first and second tubular members at a position spaced from said respective distal ends thereof, said wheel assembly serving as a fulcrum for leverage movement of said first and second tubular members;

first and second head assemblies releasably coupled to respective distal ends of said first and second tubular members, each bead assembly having an inwardly protruding gripping member with a rounded tip adapted to grip an aircraft wheel assembly;

a handle member having one end fixedly attached to said first tubular member, said handle member extending upwardly from said first tubular member to a free end disposed a distance above said hitch assembly and serving to enable a user to manipulate said first and second tubular members in upward or downward directions relative to said wheel assembly for positioning said first and second gripping members about an aircraft wheel assembly, wherein said handle member includes:
- a base portion normal to said first tubular member and fixedly attached thereto adjacent said proximal end of said first tubular member,
- a lifting portion extending upwardly from said base portion at about a 45° angle, said lifting portion extending over said hitch assembly to enable a user to manipulate said first and second tubular members in upward or downward directions relative to said wheel assembly for positioning said first and second head assemblies about an aircraft wheel assembly;

a scissor jack comprising:
- a first plate fixedly attached to said first tubular member and a second plate attached to said second tubular member;
- opposed pairs of scissor arm mechanisms aligned with and pivotally coupled at respective ends to said first and second plates and pivotally coupled together at respective opposed ends to form first and second pivot points;
- a threaded rod extending between said first and second pivot points;

an elongate handle bar having one end coupled to said threaded rod and an opposed end supported above said hitch assembly, said opposed end being coupled to a crank handle for user rotation of said elongate handle bar, wherein rotation of said threaded rod serves to open or close said pairs of scissor arm mechanisms whereby to vary the lateral spacing between said distal ends of said first and second tubular members! and wherein said crank handle is situated adjacent said lifting portion of said handle member such that said distal ends of said first and second tubular members may be simultaneously manipulated vertically and laterally by a single user upon simultaneous operation of said lifting portion of said handle member and said crank handle, respectively.

\* \* \* \* \*